US009298350B2

(12) United States Patent
Svinth (10) Patent No.: US 9,298,350 B2
(45) Date of Patent: Mar. 29, 2016

(54) MENU SEARCHING OF A HIERARCHICAL MENU STRUCTURE

(75) Inventor: Michael Helligso Svinth, Copenhagen (DK)

(73) Assignee: Microsoft Technology Licensing, LLC, Redmond, WA (US)

(*) Notice: Subject to any disclaimer, the term of this patent is extended or adjusted under 35 U.S.C. 154(b) by 807 days.

(21) Appl. No.: 12/473,218

(22) Filed: May 27, 2009

(65) Prior Publication Data

US 2010/0306259 A1 Dec. 2, 2010

(51) Int. Cl.
*G06F 7/00* (2006.01)
*G06F 3/0482* (2013.01)
*G06F 17/30* (2006.01)

(52) U.S. Cl.
CPC ........ *G06F 3/0482* (2013.01); *G06F 17/30625* (2013.01)

(58) Field of Classification Search
CPC .............. G06F 3/0482; G06F 3/04886; G06F 17/3005; G06F 17/30398; G06F 17/30769; G06F 2203/04807
USPC ......... 707/778, 797, 800, 728, 776, 769, 759, 707/999.003
See application file for complete search history.

(56) References Cited

U.S. PATENT DOCUMENTS

| | | | |
|---|---|---|---|
| 4,821,211 A * | 4/1989 | Torres | 715/853 |
| 5,845,300 A | 12/1998 | Comer et al. | |
| 6,377,965 B1 | 4/2002 | Hachamovitch et al. | |
| 7,171,353 B2 | 1/2007 | Trower, II et al. | |
| 7,334,196 B2 * | 2/2008 | Suppan et al. | 715/853 |
| 7,966,345 B1 * | 6/2011 | Funston | 707/793 |
| 2002/0196293 A1 * | 12/2002 | Suppan et al. | 345/853 |
| 2004/0243943 A1 * | 12/2004 | Matsumoto et al. | 715/841 |
| 2005/0021682 A1 * | 1/2005 | Allen et al. | 709/219 |
| 2005/0091424 A1 | 4/2005 | Snover et al. | |
| 2005/0108657 A1 * | 5/2005 | Han | 715/827 |
| 2006/0036568 A1 * | 2/2006 | Moore et al. | 707/1 |
| 2006/0101347 A1 * | 5/2006 | Runov et al. | 715/764 |
| 2006/0190436 A1 | 8/2006 | Richardson et al. | |
| 2006/0190579 A1 | 8/2006 | Rachniowski et al. | |
| 2006/0218503 A1 * | 9/2006 | Matthews et al. | 715/779 |
| 2006/0282790 A1 * | 12/2006 | Matthews et al. | 715/767 |
| 2007/0033172 A1 * | 2/2007 | Williams et al. | 707/3 |
| 2007/0150839 A1 * | 6/2007 | Danninger | 715/825 |
| 2007/0239727 A1 * | 10/2007 | Anderson et al. | 707/10 |
| 2007/0296615 A1 | 12/2007 | Raguseo | |
| 2008/0168039 A1 * | 7/2008 | Carpenter et al. | 707/3 |
| 2009/0019023 A1 * | 1/2009 | Arrouye et al. | 707/4 |
| 2010/0332325 A1 * | 12/2010 | Holte | 705/14.54 |

OTHER PUBLICATIONS

"Using Launchy to Improve Productivity with a Graphical Command Line," Jul. 8, 2007, the home of peter chng unitstep.net, http://unitstep.net/blog/2007/07/08/using-launchy-to-improve-productivity-with-a-graphical-command-line/ [last accessed Apr. 8, 2009].

* cited by examiner

*Primary Examiner* — Mohammed R Uddin
(74) *Attorney, Agent, or Firm* — Thomas Marquis; Kate Drakos; Micky Minhas (57) ABSTRACT

A menu search system allows a user to search through a menu structure, rather than only navigate hierarchically through the menu structure. When a user selects a menu search mode, the menu search system allows the user to enter text and, as the text is entered, searches the menu hierarchy for menu items with names that match the text. The menu search system then displays the matching menu items so that the user can select a displayed menu item of interest.

20 Claims, 11 Drawing Sheets

MENU SEARCHING OF A HIERARCHICAL MENU STRUCTURE

BACKGROUND

Application programs typically provide a graphical user interface through which users can navigate a menu hierarchy and select a menu item of interest. The graphical user interface may initially display top-level menu items such as "file," "edit," "view," "insert," and so on. Each top-level menu item may have second-level menu items. For example, the "file" menu item may have second-level menu items that include "new," "open," "close," "save," and so on. These second-level menu items may also have third-level menu items and so on. When a user selects a top-level menu item, the graphical user interface displays the second-level menu items associated with the selected top-level menu item. The graphical user interface may display the second-level menu items using a drop-down list, a menu ribbon, and so on. When a user selects a second-level menu item, then the graphical user interface displays any third-level menu items associated with the selected second-level menu item. When the user selects a menu item that has no lower level menu items (i.e., the selected menu item is a leaf menu item), then the graphical user interface may direct the application program to perform the action associated with that selected lower-level menu item. For example, the action may be to execute a computer program, display a dialog to solicit user input, and so on.

Figure 1:
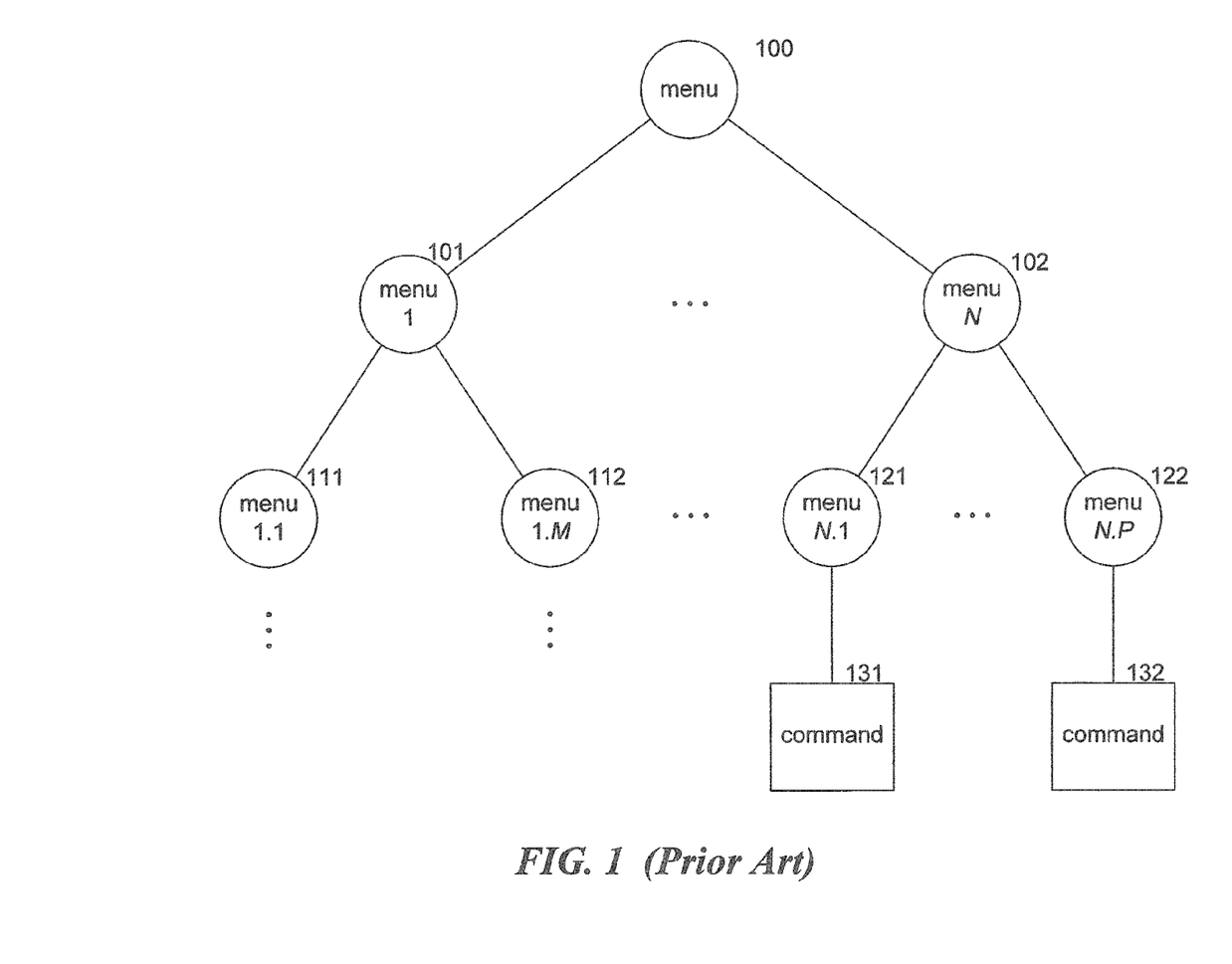
FIG. 1 is a diagram that illustrates a typical menu hierarchy.

FIG. 1 is a diagram that illustrates a typical menu hierarchy. The menu hierarchy 100 includes first-level or top-level menu items 101 and 102. The top-level menu item 101 includes second-level menu items 111 and 112, and the top-level menu item 102 includes second-level menu items 121 and 122. The second-level menu item 121 has associated with it a command 131 that is performed when the second-level menu item 121 is selected. For example, if the top-level menu item is "file" and the second-level menu item is "save," then the command may display a dialog box for saving the currently opened document. The second-level menu item 122 has associated with it a command 132 that is performed when the second-level menu item 122 is selected. The ellipses within the menu hierarchy indicate that there may be an arbitrary number of menu items at each level and an arbitrary number of levels.

Figure 2:
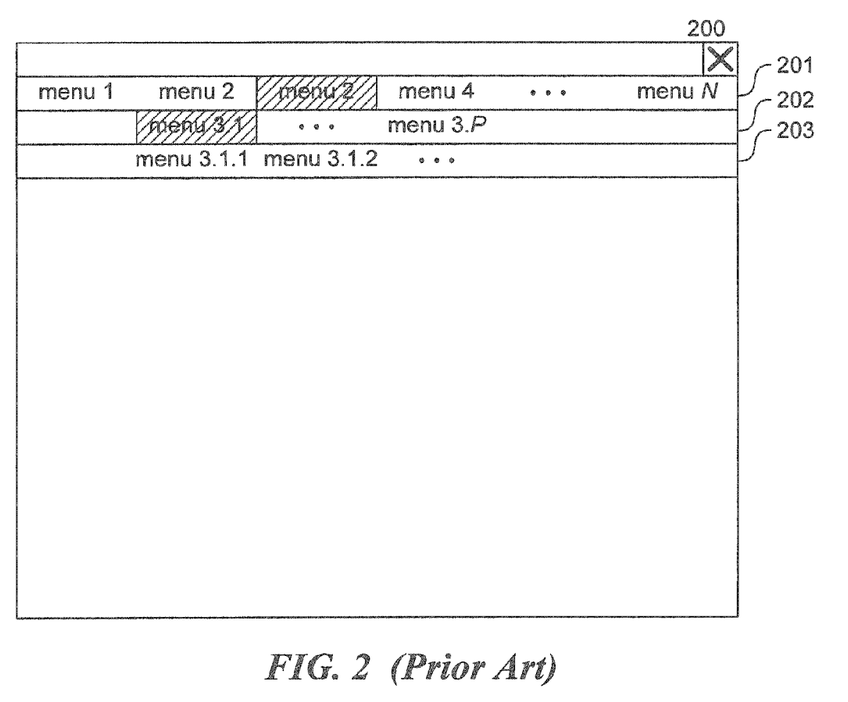
FIG. 2 illustrates a typical user interface for selecting a menu item.

FIG. 2 illustrates a typical user interface for selecting a menu item. The display page 200 includes a listing 201 of the top-level menu items. The shading of the top-level menu item "menu 3" indicates that it is currently selected. The display page 200 includes a listing 202 of the second-level menu items for "menu 3." The shading of the second-level menu item "menu 3.1" indicates that it is currently selected. The display page 200 includes a listing 203 of the third-level menu items for "menu 3.1."

Although navigating through a menu hierarchy may have an intuitive appeal to users, the complexity of some menu hierarchies makes it difficult for users to navigate to a menu item of interest for several reasons. First, a menu hierarchy may have hundreds of menu items with many menu items having many tens of child menu items. It can be time-consuming for a user to look through so many child menu items trying to identify the menu item of interest. Second, because there are so many menu items, it can be difficult for a developer of an application program to assign names to menu items that are both descriptive and easily understood by a large numbers of users. As a result, users may spend time looking through portions of the menu hierarchy that do not contain menu items of interest. Third, many application programs let end-users or third-party developers customize the menu hierarchy. For example, new menu items can be added for selecting new actions to be performed, names of existing menu items can be modified, and so on. As a result, users may not even know that menu items of interest may have been added or deleted from the menu hierarchy.

SUMMARY

A menu search system allows a user to search through a menu structure, rather than only navigate hierarchically through the menu structure. When a user selects a menu search mode, the menu search system allows the user to enter text and, as the text is entered, searches the menu hierarchy for menu items with names that match the text. The menu search system then displays the matching menu items so that the user can select a displayed menu item of interest. Because the menu search system displays the matching menu items, a user may be able to quickly identify a menu item of interest without having to navigate through the menu structure in a hierarchical manner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for selecting a menu item from a menu structure located by searching the menu structure is provided. In some embodiments, a menu search system allows a user to search through a menu structure, rather than only navigate hierarchically through the menu structure. An application program may provide a graphical user interface that allows for the selecting of menu items using a traditional hierarchical browsing through the menu structure, referred to as a menu normal mode, and for the selecting of menu items using the menu search system, referred to as a menu search mode. When a user selects the menu search mode, the menu search system allows the user to enter text and, as the text is entered, searches the menu hierarchy for menu items with names that match the text. The menu search system then displays the matching menu items so that the user can select a displayed menu item of interest. Because the menu search system displays the matching menu items, a user may be able to quickly identify a menu item of interest without having to navigate through the menu structure in a hierarchical manner.

In some embodiments, the menu search system displays a menu search window that may include an input area and a menu item area. As a user enters text in the input area, the menu search system searches the menu structure for menu items that match the text that has been input so far. For example, if the user has entered the letter "o" and the top-level menu items include an "open" and an "order" menu item, then the menu search system may display the menu items "open" and "order" in the menu item area. If one of the displayed menu items is the menu item of interest, then the user can select that menu item from the menu item area. After a menu item is selected, the menu search system may display the second-level menu items for the selected menu item in the menu item area and display the selected menu item in the input area. As the user continues to enter text in the input area, the menu search system searches for second-level menu items that match the text entered so far and displays them in the menu item area. For example, the menu search system may have initially displayed second-level menu items for the "open" menu item as "open application," "open customer," "open database," "open file," "open folder," and so on and displayed "open" in the input box and positioned an input cursor at the end of the "open." If the user then enters the letter "f," the menu search system searches the menu structure to determine that the second-level menu items "file" and "folder" match the input and displays only those second-level menu items in the menu item area—effectively performing a filtering process. In addition, the menu search system may have also searched third-level menu items for the "open" menu item to identify if any of those match the input. For example, the "open database" menu item may have a third-level menu item of "find." In such a case, the menu search system may also display the "open database find" menu item in the menu item area. In this way, a user can search through the entire menu hierarchy to locate the menu items that may be of interest without having to browse only hierarchically through the menu structure.

In some embodiments, the menu search system allows the menu structure to be integrated with other or external data sources such as a database or a file system. For example, the menu structure may include an "open" menu item at the top level and a "customer" menu item at the second level. When the user selects the "open customer" menu item, the menu search system may invoke a custom script associated with that menu item. The custom script may open a customer database and retrieve a list of the current customers from that database. The custom script may then display a list of the current customers in the menu search window. For example, the custom script may display the menu items of "open customer Acme," "open customer Microclean," "open customer Microsoft," and so on. If the user then enters the letter "m," the custom script may filter the customer list to display only "open customer Microclean" and "open customer Microsoft." When a user selects the menu item "open customer Microsoft," the custom script may then retrieve the customer record for Microsoft from the database, populate a customer form with the data from the record, and display the populated form to the user.

In some embodiments, the custom script may take complete control of the continued searching for a menu item when it is invoked by the menu search system. Alternatively, the custom script may interact with the menu search system to provide the filtered menu items to the menu search system for display and selection. When a user ultimately selects a menu item, the menu search system may then pass the selection to the custom script for performing the associated action such as displaying a customer form as discussed above.

Figure 3:
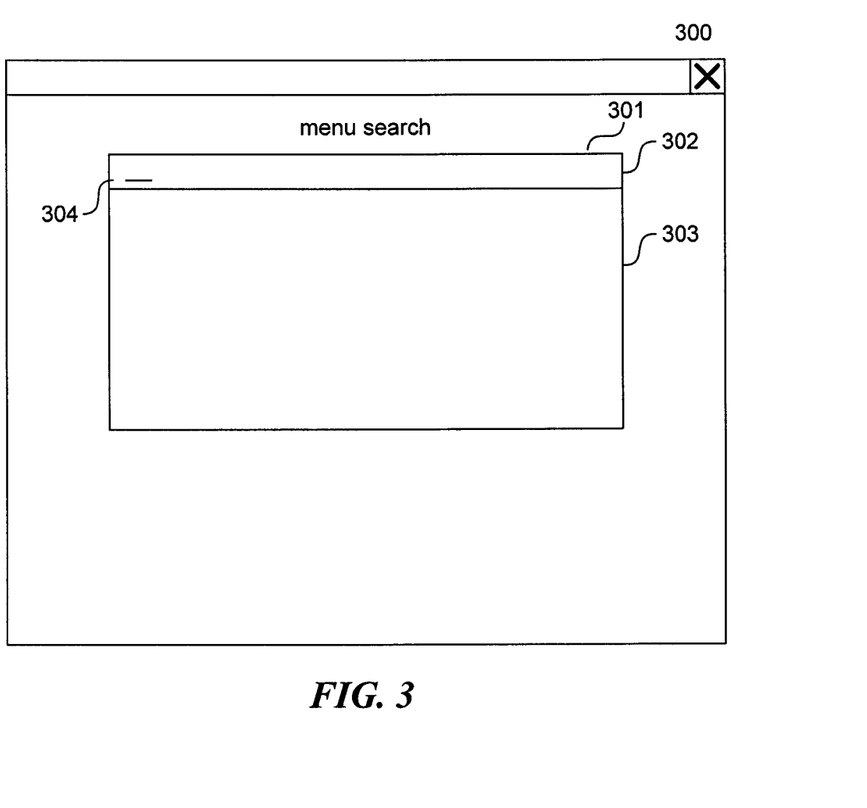
FIG. 3 illustrates a display page with a menu search window in some embodiments.

FIG. 3 illustrates a display page with a menu search window in some embodiments. The display page 300 includes a menu search window 301. The menu search window includes an input area 302 and a menu item area 303. The cursor 304 is shown positioned within the input area. As a user enters the characters in the input area, the menu search system performs the searches and displays the matching menu items in the menu item area. The menu search window is displayed when a user indicates to enter the menu search mode.

Figure 4:
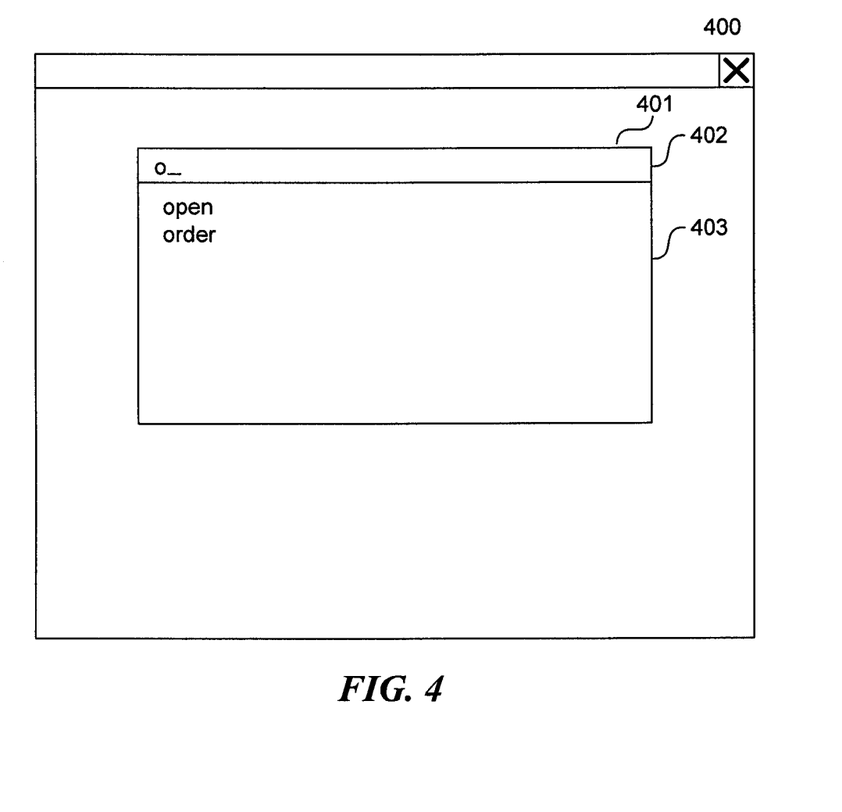
FIG. 4 illustrates a display page with a menu search window as a user enters characters in some embodiments.

FIG. 4 illustrates a display page with a menu search window as a user enters characters in some embodiments. The display page 400 includes a menu search window 401 with an input area 402 and a menu item area 403. As the user entered the letter "o" in the input box, the menu search system identified the matching menu items of "open" and "order" and displayed those menu items in the menu item area.

Figure 5:
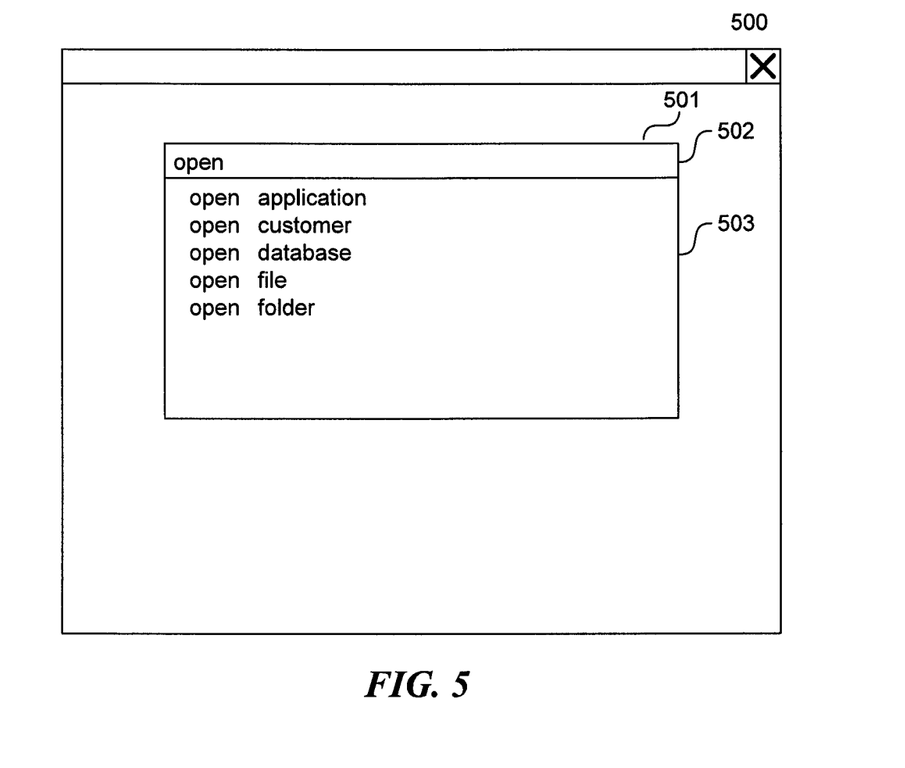
FIG. 5 illustrates a display page with a menu search window as a user selects a menu item in some embodiments.

FIG. 5 illustrates a display page with a menu search window as a user selects a menu item in some embodiments. The display page 500 includes a menu search window 501 with an input area 502 and a menu item area 503. As the user selected the menu item "open," the menu search system identified the second-level menu items of "application," "customer," "database," "file," and "folder" and displayed those menu items in the menu item area.

Figure 6:
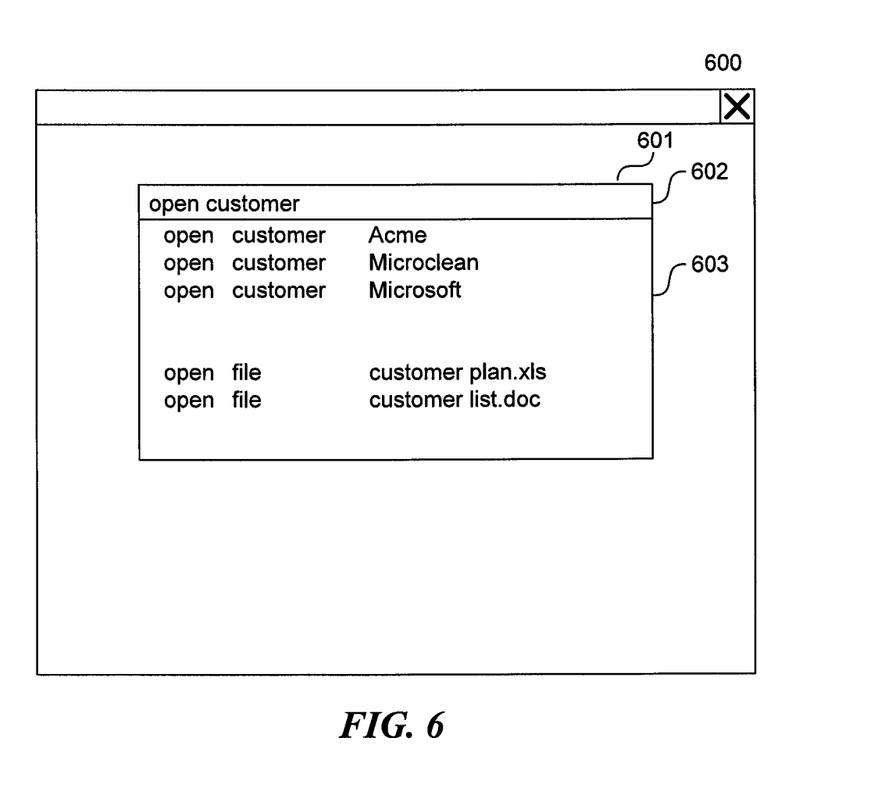
FIG. 6 illustrates a display page with a menu search window as a user enters additional characters in some embodiments.

FIG. 6 illustrates a display page with a menu search window as a user enters additional characters in some embodiments. The display page 600 includes a menu search window 601 with an input area 602 and a menu item area 603. As the user enters the text "customer" in the input area, the menu search system searches for menu items that match "open customer." The menu search system identified that the menu items "customer Acme," "customer Microclean," "customer Microsoft," "file customerplan.xls," and "file customerlist.doc" match the input and displayed them in the menu item area. Even though the input "customer" did not match the second-level menu item "file," the menu search system determined that it matched some of the third-level menu items. In this example, the third-level menu items are the names of files that contain the word "customer." The "open file" menu item may have had a custom script associated with it that was invoked by the menu search system to determine whether it had any menu items that would match "customer."

Figure 7:
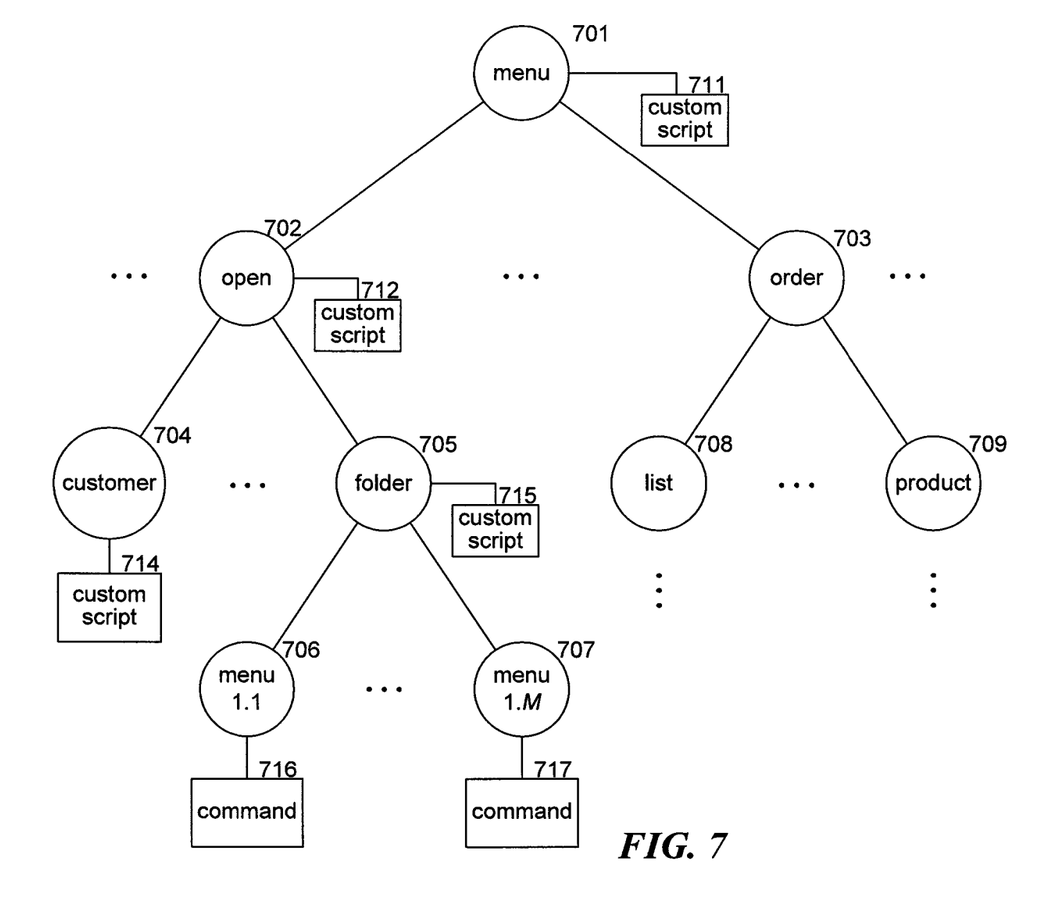
FIG. 7 is a diagram that illustrates a menu hierarchy with custom scripts in some embodiments.

FIG. 7 is a diagram that illustrates a menu hierarchy with custom scripts in some embodiments. The menu hierarchy 700 includes a root menu item 701 and top-level menu items 702 and 703. The top-level menu item 702 has second-level menu items 704 and 705. The second-level menu item 705 has third-level menu items 706 and 707. The top-level menu item 703 has second-level menu items 708 and 709. The root menu item 701 has associated custom script 711, the top-level menu item 702 has associated custom script 712, the third-level menu item 704 has associated custom script 714, and the third-level menu item 705 has associated custom script 715. In this example, because the root menu item has an associated custom script, the menu search system may, when a user indicates to enter the menu search mode, invoke the custom script 711 to allow fully customized menu searching. If the root menu item 701 did not have an associated custom script, then the menu search system would initially display the menu search window with the menu item area populated with the top-level menu items 702 and 703. When a user selects the top-level menu item 702, the menu search system invokes the custom script 712 to perform any custom searching. When the user selects the third-level menu item 704, the menu search system invokes the custom script 714 to perform the custom searching such as the searching for customers in a database as described above. Menu items may also have conventional commands associated with them. Thus, if a user enters the menu search mode and ultimately selects the "open folder local" menu item 706, then the menu search system invokes the command 716. However, if the menu item 706 also had an associated custom script, the menu search system would invoke that custom script, and the application program would invoke the command when in menu normal mode.

Figure 8:
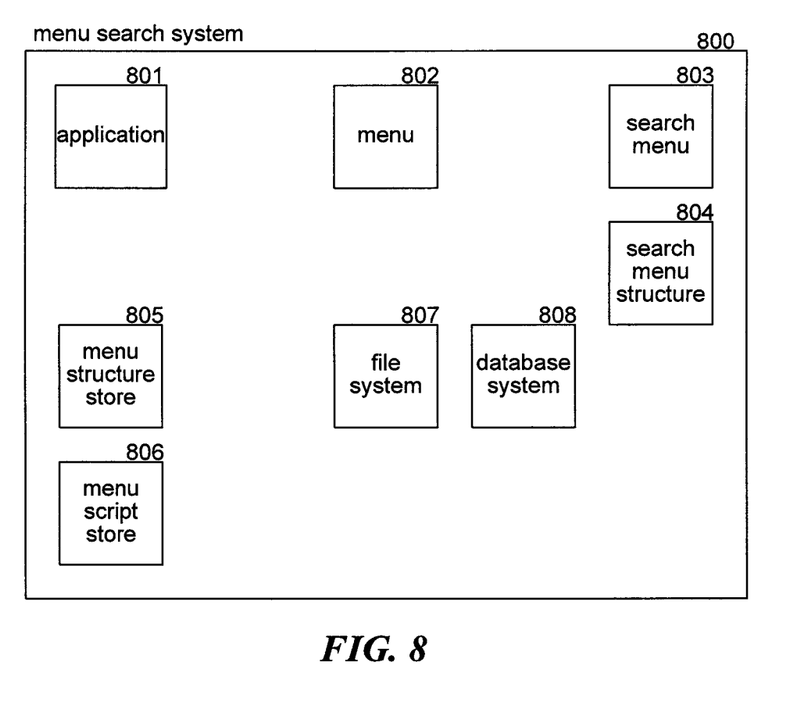
FIG. 8 is a block diagram that illustrates components of the menu search system in some embodiments.

FIG. 8 is a block diagram that illustrates components of the menu search system in some embodiments. The menu search system 800 includes an application program 801, a menu component 802, a search menu component 803, and a search menu structure component 804. The menu search system may also include a menu structure store 805, a menu script store 806, a file system 807, and a database system 808. The application may provide a user interface through which a user can select a menu normal mode or a menu search mode. If a user selects the menu normal mode, then the application invokes the menu component. If the user selects the menu search mode, then the application invokes the menu search system. The menu search system provides a menu search window and invokes the search menu structure component to search the menu structure store for menu items that match user input. The menu search component also invokes the custom scripts of the menu script store. The custom scripts of the menu script store may invoke the file system component and database system component to identify custom menu items.

The computing device on which the menu search system is implemented may include a central processing unit, memory, input devices (e.g., keyboard and pointing devices), output devices (e.g., display devices), and storage devices (e.g., disk drives). The memory and storage devices are computer-readable storage media that may be encoded with computer-executable instructions that implement the combinable menus search system, which means a computer-readable medium that contains the instructions. In addition, the instructions, data structures, and message structures may be transmitted via a data transmission medium, such as a signal on a communication link. Various communication links may be used, such as the Internet, a local area network, a wide area network, a point-to-point dial-up connection, a cell phone network, and so on.

Embodiments of the menu search system may be implemented in various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The menu search system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 9:
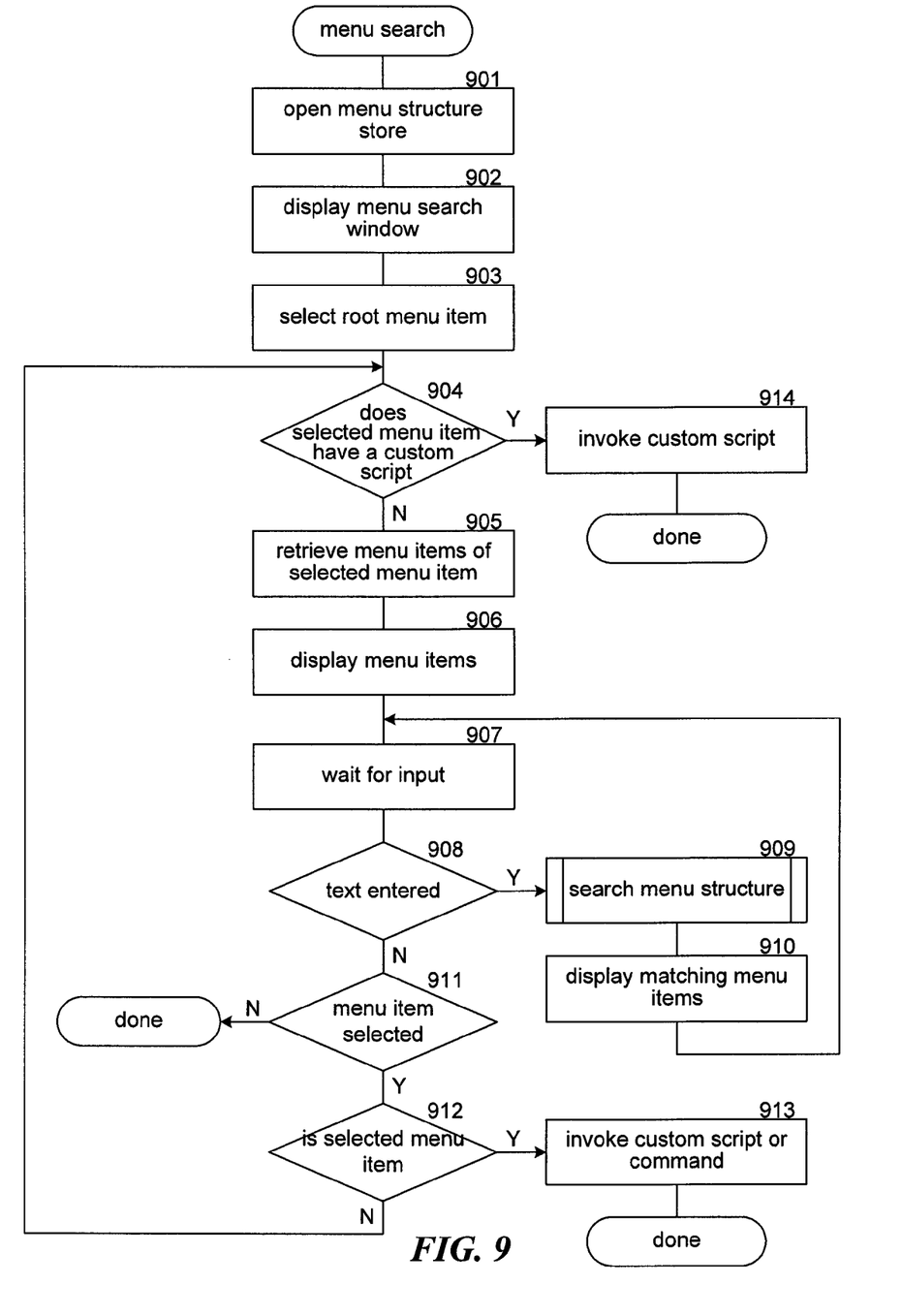
FIG. 9 is a flow diagram that illustrates the processing of a menu search component of the menu search system in some embodiments.

FIG. 9 is a flow diagram that illustrates the processing of a menu search component of the menu search system in some embodiments. The menu search component may be invoked when a user indicates to enter the menu search mode for an application program. In block 901, the component opens the menu structure store. In block 902, the component displays the menu search window, which may include an input area and menu item area. In block 903, the component selects the root menu item of the menu structure. In blocks 904-912, the component loops searching for menu items. In block 904, if the selected menu item has a custom script, then the component continues at block 914, else the component continues at block 905. In block 905, the component retrieves the menu items of the selected menu item. In block 906, the component displays the retrieved menu items in the menu item area of the menu search window. In blocks 907-910, the component loops waiting for input and processing the text that has been entered. In block 907, the component waits for input. In decision block 908, if the input is entered into the input area, then the component continues at block 909, else the component continues at block 911. In block 909, the component invokes the search menu structure component to identify menu items that match the input. In block 910, the component displays the matching menu items in the menu search window and then loops to block 907 to wait for the next input. In decision block 911, if the user has selected a menu item, then the component continues at block 912, else the component completes or performs further processing. In decision block 912, if the selected menu item is a leaf menu item within the menu structure, then the component continues at block 913, else the component loops to block 904 to determine if the selected menu item has a custom script. In block 913, the component invokes the custom script for the selected item, and when there is no custom script, invokes the command associated with the selected menu item and then completes. In block 914, the component invokes the custom script for the selected menu item and then completes.

Figure 10:
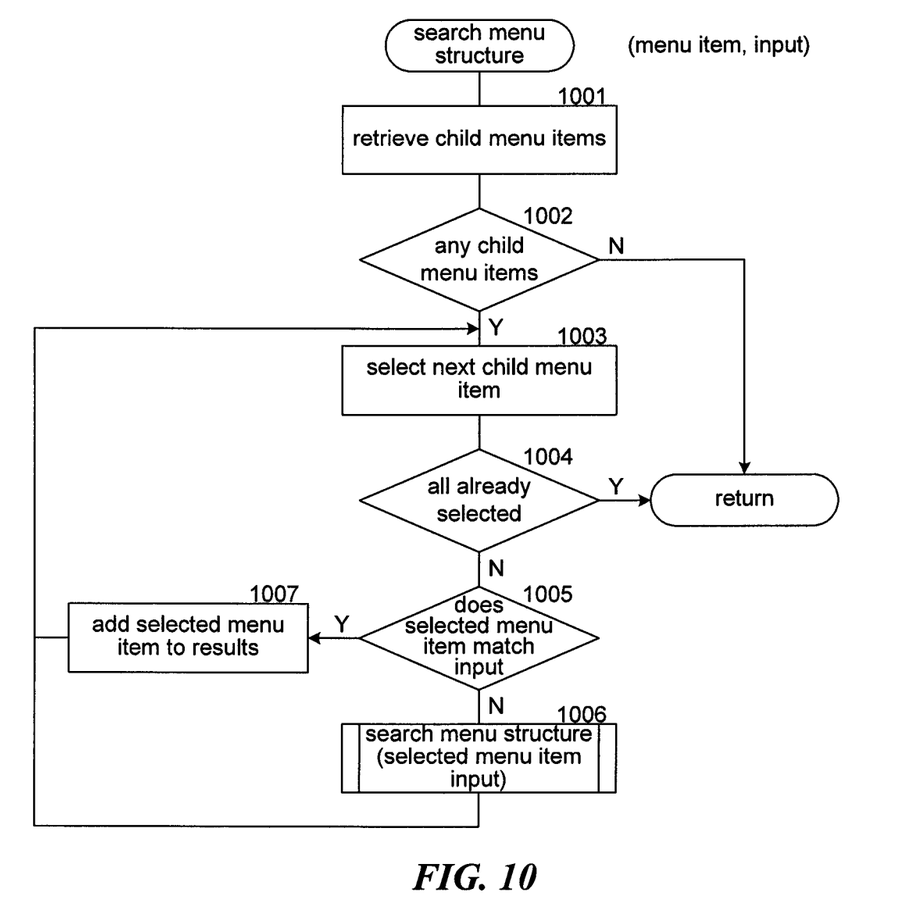
FIG. 10 is a flow diagram that illustrates the processing of the search menu structure component in some embodiments.

FIG. 10 is a flow diagram that illustrates the processing of the search menu structure component in some embodiments. The component is passed a menu item and an indication of user input. The component loops searching from the passed menu item to descendent menu items to find matching menu items. The component recursively invokes itself. In block 1001, the component retrieves the child menu items of the passed menu item. In decision block 1002, if there are any child menu items, then the component continues at block 1003, else the component returns. In blocks 1003-1007, the component loops searching for matching menu items. In block 1003, the component selects the next child menu item. In decision block 1004, if all the child menu items have already been selected, then the component returns, else the component continues at block 1005. In decision block 1005, if the selected menu item matches the input, then the component continues at block 1007, else the component continues at block 1006. In block 1006, the component recursively invokes the search menu structure component passing the selected menu item and the passed input to search for matching menu items at lower levels. The component then loops to block 1003 to select the next child menu item. In block 1007, the component adds the selected menu item to the results of the search and then loops to block 1003 to select the next child menu item. Upon completion, the results of the search will contain the matching menu items.

Figure 11:
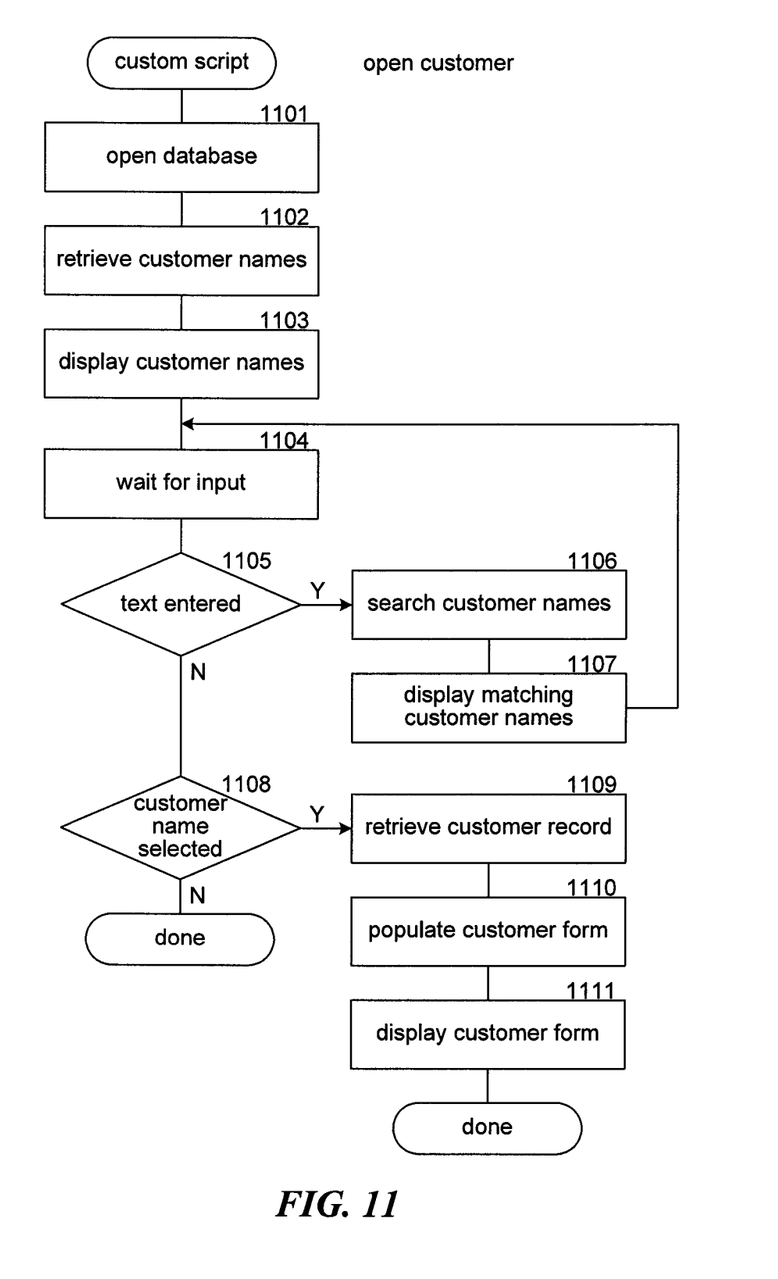
FIG. 11 is a flow diagram that illustrates the processing of an example custom script in some embodiments.

FIG. 11 is a flow diagram that illustrates the processing of an example custom script in some embodiments. This custom script may be associated with an "open customer" menu item. The custom script retrieves the customer names from a database, allows the user to filter a customer name, and then when the user selects a customer name, displays a form with information of that customer. In block 1101, the component opens the database. In block 1102, the component retrieves the customer names from the database. In block 1103, the component displays the customer names in the menu search window. In blocks 1104-1107, the component loops filtering the customer names. In block 1104, the component waits for input. In decision block 1105, if the input is text, then the component continues at block 1106, else the component continues at block 1108. In block 1106, the component searches for customer names that match the input text. In block 1107, the component displays the matching customer names in the menu search window and loops to block 1104 to wait for further input. In decision block 1108, if the input was the selection of a customer name, then the component continues at block 1109. In block 1109, the component retrieves the customer record from the database. In block 1110, the component populates a customer form with the data from the retrieved customer record. In block 1111, the component displays the customer form and then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. One skilled in the art will appreciate that a script (custom script or menu search script) can be customized in any manner. For example, a custom script could retrieve menu items from an external source such as a server accessible via the Internet. If the menu structure includes a "buy stock small" menu item, its custom script may search a server for publicly traded companies with small capitalizations. The custom script can then display the company names as the next level of menu items. Also, although the term "menu item" has been used to describe the elements of the menu structure, the "menu items" may include menus, sub-menus, commands, options to be selected for a menu item (e.g., the option may select a specific printer for a "print" command), and so on. Also, the input of the input box may include wildcard-type characters, the searching may be prefix searching, and the searching may be performed as each character is entered. Accordingly, the invention is not limited except as by the appended claims.

I claim:

1. A method in a computing device for selecting a menu item from a menu structure of an application program, the method comprising:
 receiving from a user as a currently selected menu item a selection of a root menu item of the menu structure, the menu structure having hierarchically organized menu items with parent and child relationships forming a menu hierarchy, each menu item having a menu item name comprising text characters;
 displaying on a display device of the computing device a menu search window that includes an input area and a menu item area; and
 repeating until the currently selected menu item has no child menu items:
  displaying in the menu search window an indication of the currently selected menu item and any ancestor menu items of the currently selected menu item;
  receiving via the menu search window input from the user;
  when the received input is one or more text characters received via the input area,
   searching the menu structure for matching menu items that are descendent menu items of the currently selected menu item and that have menu item names that match the received one or more text characters, the searching limited to menu items that are descendent menu items of the currently selected menu item; and
   displaying in the menu item area an indication of the matching menu items and ancestor menu items of the matching menu items; and
  when the received input is a selection of a displayed menu item of the menu item area as the currently selected menu item,
   when the currently selected menu item has child menu items, displaying in the menu item area an indication of the child menu items; and
   when the currently selected menu item has no child menu items, performing by the application program a command associated with the currently selected menu item.

2. The method of claim 1 wherein when the currently selected menu item has an associated menu search script, invoking the menu search script.

3. The method of claim 2 wherein the invoked menu search script searches a database for records associated with the currently selected menu item and displays an indication of the records in the menu item area as menu items.

4. The method of claim 1 including upon receiving from the user an indication to enter a menu normal mode, allowing the user to hierarchically select menu items.

5. The method of claim 1 wherein the command associated with the currently selected menu item executes an application associated with the selected menu item.

6. The method of claim 1 wherein a menu item name matches the received one or more text characters based on whether the menu item name includes the received one or more text characters.

7. The method of claim 1 wherein a menu item name matches the received one or more text characters when the received one or more text characters form a prefix of the menu item name.

8. The method of claim 1 wherein the received one or more text characters include a wildcard character to be used in the search for descendent menu items with matching menu item names.

9. The method of claim 1 wherein the searching is performed as each text character is received.

10. A computing device with a display for selecting a menu item from a menu structure, comprising:
 a menu store storing a menu structure having hierarchically organized menu items;
 a component that displays on the display of the computing device a menu search window, that includes an input area and a menu item area;
 a component that, upon receiving search input from a user via the input area, searches the menu structure of the menu store for menu items that match the search input and that are descendent menu items of a currently selected menu item and displays in the menu item area of the search window an indication of only the menu items that match the search input and that are descendent menu items of a currently selected menu item; and
 a component that, upon receiving a selection of a displayed menu item as a new currently selected menu item, performs a command associated with the currently selected menu item when the currently selected menu item has no child menu items and displays in the menu item area a child menu item of the currently selected menu item when the currently selected menu item has a child menu item for further searching based on the new currently selected menu item.

11. The computing device of claim 10 including a component that, when the currently selected menu item has an associated menu search script, invokes the menu search script to perform customized searching for menu items.

12. The computing device of claim 11 wherein the invoked menu search script searches an external source for records associated with the selected menu item and displays an indication of the records in the menu item area of the menu search window as menu items.

13. The computing device of claim 11 wherein the invoked menu search script searches for files of a file system that are associated with the currently selected menu item and displays an indication of the records in the menu search window as menu items.

14. A method performed by a computing device with a display, the method comprising:
   receiving from a user a selection of a menu item of a menu structure, the menu structure having hierarchically organized menu items with parent and child relationships forming a menu hierarchy;
   displaying on the display a menu search window that includes an input area and a menu item area;
   displaying in the menu search window an indication of the selected menu item and any ancestor menu items of the selected menu item;
   receiving via the input area input from the user;
   when the received input is one or more text characters,
      searching the menu structure for matching menu items that are descendent menu items of the selected menu item and that have menu item names that match the one or more text characters, the searching limited to menu items that are descendent menu items of the selected menu item; and
      displaying in the menu item area an indication of the matching menu items that match and ancestor menu items of the matching menu items that match;
   when the received input is a selection of a displayed menu item that has child menu items, displaying an indication of the child menu items; and
   when the received input is a selection of a displayed menu item that has no child menu items, performing by the application program a command associated with the selected menu item.

15. The method of claim 14 wherein when the received input is a selection of a displayed menu item that has an associated menu search script, invoking the menu search script.

16. The method of claim 15 wherein the invoked menu search script searches a database for records associated with the selected displayed menu item and displays an indication of the records in the selcted displayed menu item area as menu items.

17. The method of claim 14 wherein a menu item name matches the one or more text characters based on whether the menu item name includes the one or more text characters.

18. The method of claim 14 wherein a menu item name matches the one or more text characters when the received one or more text characters form a prefix of the menu item name.

19. The method of claim 14 wherein the one or more text characters include a wildcard character to be used in the search for matching menu item.

20. The method of claim 14 wherein the searching is performed as each text character is received.

* * * * *